Sept. 27, 1966     H. BENMUSSA ETAL     3,275,753
ELECTRONIC TRANSLATOR
Filed Jan. 7, 1963                               9 Sheets-Sheet 1
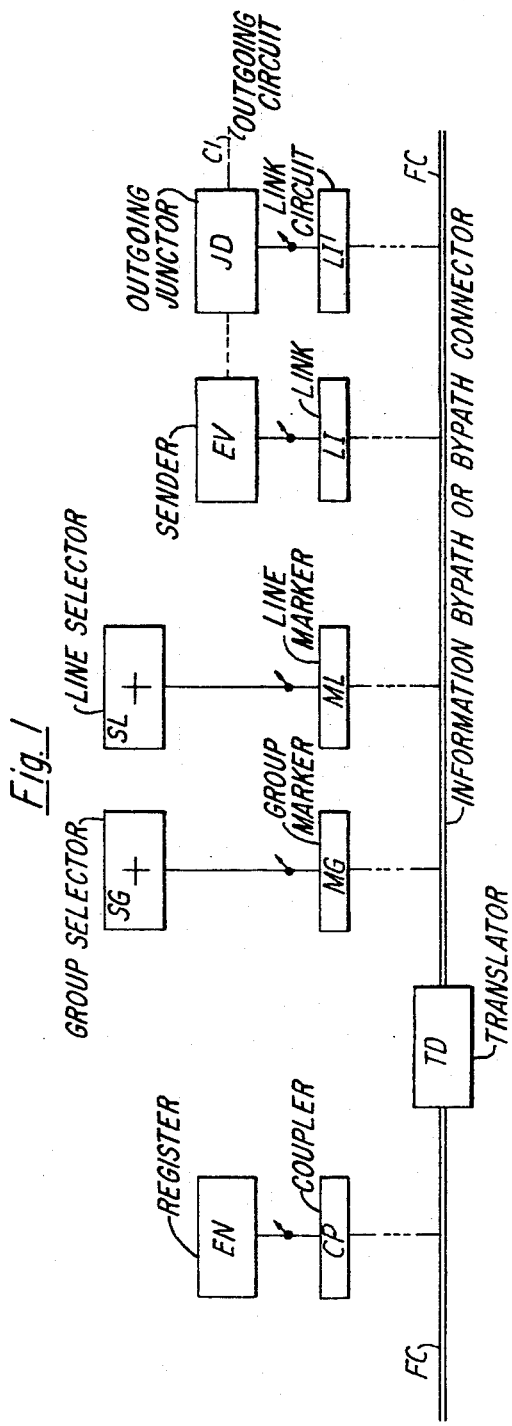
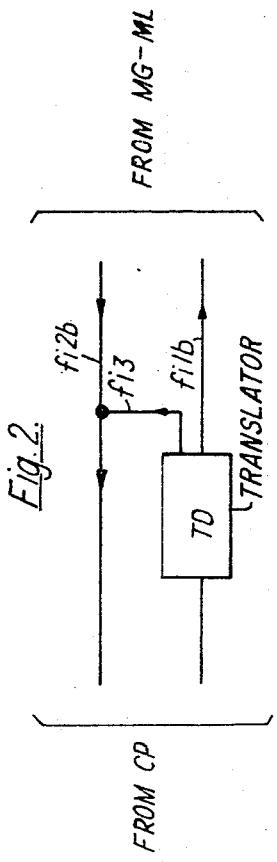
Inventors
H. BENMUSSA
M. J. CLERC
By
Attorney

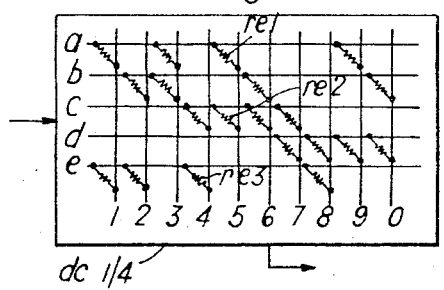
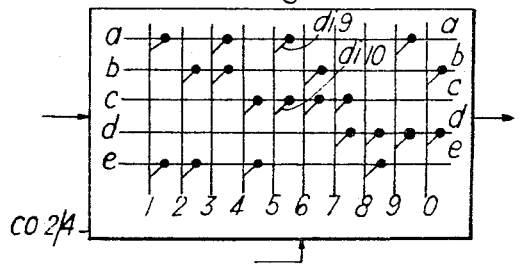
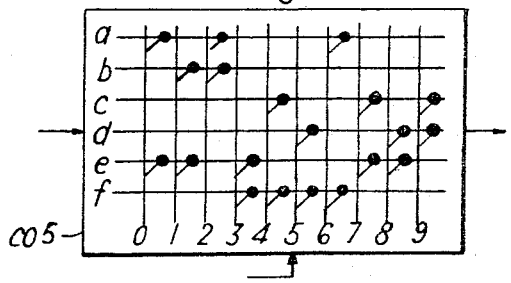

Sept. 27, 1966 H. BENMUSSA ETAL 3,275,753
ELECTRONIC TRANSLATOR
Filed Jan. 7, 1963 9 Sheets-Sheet 8

Inventors
H. BENMUSSA
M. J. CLERC
By Paulo Hemminger
Attorney

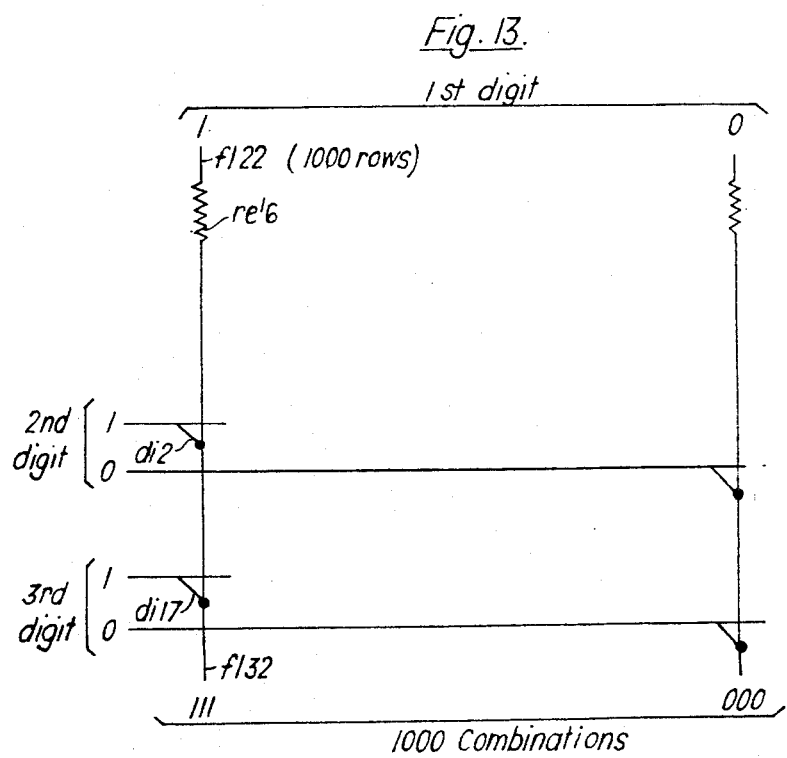

United States Patent Office

3,275,753
Patented Sept. 27, 1966

3,275,753
ELECTRONIC TRANSLATOR
Henri Benmussa, Meudon, and Maurice Jean Clerc, Nanterre, France, assignors to International Standard Electric Corporation, New York, N.Y., a corporation of Delaware
Filed Jan. 7, 1963, Ser. No. 249,783
Claims priority, application France, Jan. 31, 1962, 886,518, Patent 1,325,636
8 Claims. (Cl. 179—18)

The present invention relates to improvements which are brought to telephone systems and concerns in particular a very fast operating electronic translator.

Taking the case of a network having a certain number or exchanges, the caller reaches his party by dialling a prefix or office code made up of a combination of several characters or digits. There is no simple relation, of course, between this prefix and the digits which are necessary for establishing the call right up to the requested station, since the route which is to be taken depends upon the geographical respective positions of caller's and called subscriber's stations, and, upon congestion of the circuits; therefore a translating operation is indispensable. Precisely speaking, the translator has to provide, as from this prefix, the digits necessary to orient the selectors of transmitting station and, if needs be, the selectors of the distant stations (internal and external selections); it will determine also the call-charging fee in taking into account the call origin as well as the destination reached by the call. The translator is able to receive, in addition to the prefix, items of information so-called "modification data" that will act upon the translating; a prefix, thus, will not for instance have the same meaning according as to whether it forms part of a "national" dialled number or a "regional" dialled number, and it must result into different routings of the call in the one case and in the other; furthermore, translation will depend upon caller's category since some subscribers are restricted service subscribers and are switched onto operator or onto a speaking machine in case they dial a forbidden number.

Generally speaking, the register meant to receive the number dialled by the caller, would seize the translator as soon as it receives a given number of digits, say two digits, and would transmit at once to this translator the two said digits. If the translator has not got the full necessary elements to effect its function, it will inform the register and will release. Subsequently, after receiving the next digit or the several next digits, the register will seize the translator once more. The latter, thus, is immobilized for a very strictly necessary period of time only, and the postponing of the translating operations is avoided everytime the translation can be effected at once.

According to a first conception, the translator will receive the necessary information from the register and transmit back to it all the translated digits as well as the call-charging fee indication, and will release. It would be necessary then to provide inside the register a certain number of memories, often quite a high number, so that the translated items of information may be stored until such time as they can be used—this of course represents a costly operating process. According to another conception, the translator will be seized only each time a translated item of information is required, but there will be transmitted to the said translator—in addition to the prefix and to the "modification data"—so-called "stage in process data" information which will indicate the stage at which lies the routing of the call; the translator is then able to supply to the corresponding selectors the one or the several translated digits without having to pass through the register; therefore the realization of the latter is thus much simplified. To accomplish this operating process, the translator, as soon as it receives the prefix, transmits all necessary instructions to the register; the latter will know therefore that it has to send the prefix out several times for translation purposes. It will also be aware that it must then send back the whole or part of the dialled number without translation.

Naturally, to transmit selective indications from register to selectors in passing through the translator, use can be made of the portion of the selection chain which is already established, but, besides the two line wires, there only are available for use two or three connecting wires, which therefore limits the possibilities. It is preferable thus to provide a by-path circuit or "connecting circuit" which is made up of some groups of wires enabling subsequently the instantaneous transmitting of many items of information, each item emitted in code form and being assigned a group of wires. An electronic solution is adopted in some systems, by making use of only a single group of connecting lines transmitting the information as per the time-division multiplex system principles, a time-position (or time-period position) which is taken inside a cycle of positions, is assigned to each pair of units liable to interchange information. Since this time-period position is very short—say some tens of microseconds—the translator will have to accomplish its function very rapidly, and that would require the use of electronic components, such as diodes and transistors.

The purpose of this invention is to realize an electronic translator to meet such needs and afford at the same time several advantages such as: simplicity, economy and reliability.

A feature of the present invention is a translator constituted by the combination of the following elements: (a) input decoders for receiving, in the form of codes, the various digits of the prefix (or office code) and deliver in clear the corresponding indications, (b) an analyser for combining these indications and for determining the route corresponding to the combination, (c) an amplifier, for each route, placed at the output of the analyser and delivering, in succession, under control of the "stage in process data," the different translated digits in clear, (d) output coders putting into code the digits originating from route amplifier, and transmit them onto the utilizing apparatus; each one of the above elements being made of electronic components so as to afford very rapid translation.

A code will be presented in the form of a same potential applied to a combination of wires, two wires out of five, for instance; an item of information in clear is materialized by a signal along a single wire chosen among several; if use is made of ten wires, the information is said to be "decimal." The decoders and coders can be realized by means of matrices made up of resistors or diodes of a well known and currently used type.

Another feature of the present invention is an analyzer which comprises a set of amplifiers for the first digit, and a set of absorbers for the second digit; the amplifier, which corresponds to the first digit received, being unblocked and generating a signal which is made to derive through all the absorbers, with the exception of the one corresponding to the second digit received, so that finally the signal is gathered from upon an outlet, and one only, which characterizes the two digits received; this arrangement enabling to effect the analysing in a simple and economical way, so much from equipment point of view, as from the electric current consumption point of view.

According to a variant, another feature of the invention would be to reverse the amplifiers' and absorbers' respective functions the second digit acting upon one of the amplifiers, and the first digit acting upon one of the absorbers.

According to another feature of the invention, use is made of transistor amplifiers normally blocked, and of transistor absorbers normally conductive; the first digit received will unblock one of the amplifiers and the second digit will block one of the absorbers.

Another feature of the invention is an analyser comprising a set of amplifiers for the first digit and a set of absorbers for every one of the next digits; the amplifier, which corresponds to the first digit received, is unblocked and generates a signal which is made to derive through all the absorbers with the exception of one only, chosen in each set, and characterizing the corresponding digit; so that finally the signal is gathered from upon an outlet, and one only, which characterizes the combination of all the digits.

According to another feature of the invention, two analysers normally blocked are used, one of them being unblocked by means of the "national" information and the other by means of the "regional" information, so that finally a signal is gathered from upon an outlet, and one only, characterizing at the same time the prefix (or office code) and its signification (national or regional).

According to another feature of the invention, use is made, between outlets of the analyser and the route amplifiers, of an intermediate distributing frame made up of a grid of horizontal and vertical conductors, the inputs will correspond to the vertical conductors and the outputs to the horizontal conductors, or vice versa; the linking between an input and an output is made at one's request by means of a movable plug or a similar component; decoupling devices, such as diodes, are provided to avoid the mixings and can be integrated in the plugs.

According to another feature of the invention, an amplifier is provided for every route or path; this amplifier comprises one outlet per each translated digit; on every one of these outlets there is inserted a gate normally non-conducting, a "stage in process data" information which is received at each stage of the call-routing would make conducting one or several gates so as to deliver in clear the one or several translated digits which correspond to this stage; these latter digits will be coded and then sent into the utilising apparatus.

According to another feature of the invention, the inputs of the translator are connected to the corresponding outlets by means of a derivation or a "by-path" circuit, and to insert normally non-conducting gates upon this circuit; when a "stage in process data" information is received requesting a retransmission without translation, these gates are made conductive, everything going on as if the translator is eliminated.

Another feature of the invention is an input decoder, to receive in the form of codes, the various "stages in process data" information, and to deliver in clear the corresponding indications in order to make conducting in succession the gates associated with the route amplifier and the gates which enable the retransmission of digits without translation.

According to another feature of the invention, use is made of a same code having two meanings, that is to say, a "stage in process data" information and a "modification data" information; two decoders being provided for bringing out in clear each one of these two items of information, this arrangement enabling to realize savings in wires on the inputs of the translator.

Another feature of the invention is a comparator which receives on one hand the route category indication, and on the other hand the category of the calling subscriber; in the case where the route which corresponds to the dialed prefix (or office code) is allowed to the calling subscriber, the comparator makes conducting a gate allowing the passing through of the "stage in process data" information onto the route amplifier; in the case where the route is forbidden to the calling subscriber, it makes conducting another gate which allows the route amplifier to feed an amplifier which corresponds to another route, the various translated digits being obtained from this latter amplifier and requesting thus a re-routing of the call.

According to another feature of the invention, when incompatibilty exists between route category and caller's category, the comparator effects a choice and determines a re-routing path which will take into account the caller's category, the call being able to be switched onto an operator's position if the caller is a subscriber, or switched onto a busy-tone generating unit if the caller happens to be an operator.

According to another feature of the invention, there is provided for each route category one or several feedings through resistors; and for each called category, a derivation through a diode, the signal received along the route category wire being normally made to derive through the caller's category wires with the exception of the one that corresponds to the received category indication, so that finally the signal is gathered from upon an outlet, and one only, which depends upon the route category and upon calling subscriber's category.

According to another feature of the invention, one or several additional outlets are provided upon the route amplifier, and these outlets are connected through a distributing frame, onto the route category wires required; an input decoder receives, in code form, the calling subscriber's category indication and delivers in clear normal wording the corresponding information before sending it to the comparator.

According to another feature of the invention, there is supplied to the comparator, besides the indication of the calling subscriber's category, other "modification data" information such as a request for diversion, so that the comparator may switch the call onto an auxiliary route which is chosen by taking into account the calling subscriber's category.

According to another feature of the invention, when the number of digits received is insufficient for determining the routing of the call the signal gathered from upon the output of the analyser is to be switched, through the distributing frame, onto a route amplifier which delivers a particular, or special, translated information in order to ask the register for one or several additional digits, an absorber being unblocked after the reception of these digits, so as to cancel the signal generated previously by the analyser.

Another feature of the invention is to provide, for certain prefixes (or office codes), several outlets upon the analyser; the signal delivered upon these outlets being all absorbed, with the exception of one only, by an appropriate switching device (day night switching, for instance), which enables for a same prefix, to choose a route that will depend upon the position of the switching device.

Another feature of the invention is that the translated digit corresponding to the call-charging fee indication be delivered, by the route amplifier, along a given wire chosen inside a set of wires, these wires being connected to the corresponding inlets of a coding matrix, so that there is sent out onto the outlet of the translator, a code which corresponds to the normal fee (day fee); a switching operation is provided for modifying the linking between the set of call fee-charging wires and the inlets of the coding matrix so as to send onto the oulet of the translator, a code corresponding to the reduced feet (night fee).

Another feature of the invention is to link one same fee-charging wire, originating from the route amplifier, onto two different inlets of the coding matrix and to insert a gate upon each one of the links thus obtained, an appropriate switching device (day night switching, for instance) being provided to render conductive one of these two gates and to make non-conducting the other one.

Various other features of the invention will become apparent and the invention will be best understood by reference to accompanying specification given as non-limitative example, and taken in conjunction with the drawings comprising FIGURES 1 to 13, wherein:

FIGURE 1 is a block diagram showing the main control and checking common units utilized in exchanges of known type, as well as the "information by-path" or by-path connector, and the translator, enabling the interchanging of information between the said units;

FIGURE 2 is a detail of the "information by-path" relating to the translation of the information;

FIGURE 8 shows the way FIGURES 4 to 7 should be assembled;

FIGURE 9 shows the decoding matrix enabling to obtain, from a code "two out of five," a decimal item of information;

FIGURE 10 shows the coding matrix enabling to obtain, from a decimal item of information, a code "two out of five";

FIGURE 11 shows the coding matrix enabling to obtain, from a decimal item of information, a code "two out of six";

FIGURE 13 shows the analysing of the three-digits combinations.

Figure 3:
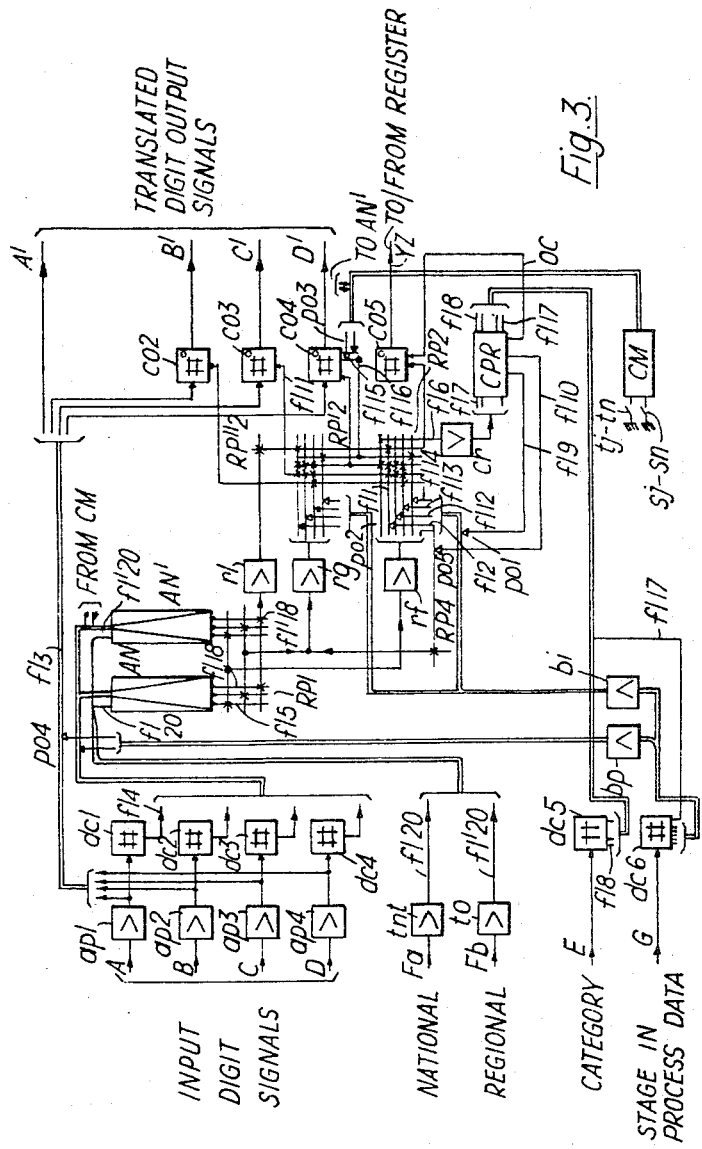
FIGURE 3 shows the general operating block diagram of the electronic translator disclosed by the present invention.

The electronic translator, which is the purpose of the present invention, is provided mainly to be inserted on the track of the electronic "information by-path" connector, which is disclosed in Patent No. 3,226,487 relating to "Telephone Systems." However, the solution given by the invention is very general and can be applied to most various types of telephone systems.

*The interchanging of information between the main common apparatus in an exchange-office of known type.* —The main common checking and control apparatus utilized in the telephone system in the above mentioned patent application, are: the register EN (FIGURE 1), the group marker MG, the line marker ML and the sender EV. The register EN receives the various digits dialled by the calling subscriber and stores them in memory in order to retransmit them to the various selection stages as and when these latter can accept them. The group marker MG receives from the register the portion or part of the telephone number which enables it to orientate the associated selection stage SG either onto a group of local subscribers or onto a group of outgoing circuits; the line marker ML receives from the register the portion or part of the telephone number which enables it to effect the selection of the called subscriber inside his group; finally, the sender EV receives the various digits meant to be transmitted onto an outgoing circuit CI through an outgoing junctor JD in order to adapt them to the transmission conditions of this circuit. Thus, for instance, the digits are emitted upon certain circuits in the form of numerical impulses; upon other circuits, these digits are emitted in the form of direct current polarity combinations or currents of different frequencies. In general, two digits are necessary to orientate the group selection stage and three digits to orientate the line selection stage. In some important exchanges, two stages of group selection are provided.

A certain amount of information is liable to be interchanged between the register, on one hand, and the group marker, the line marker and the sender on the other hand. In particular, the register transmits to the markers the digits necessary for the selection; and on their side, the markers send back to the register an acknowledgment of receipt, then, after each selection, there is sent the category indication of the line chosen, so as to enable the register to give to the call all further action required. In order to transmit these various items of information, it would of course be possible to pass through the selection chain; but there will be available for use, besides the two line wires, only two or three connection wires. In order to gain time and to transmit several items of information in practically instantaneous manner, preference is given to the use of an "information by-path" or bypath connector FC; by using the well known code "two out of five" a bunch of five wires is provided per item of information, a group of $5p$ wires enabling to transmit $p$ items of information at the same time. The markers MG and ML, which are few in number will connect directly onto "information by-path" or by-path connector FC; on the other hand, the registers EN will connect through the common apparatus CP, so-called "couplers." Likewise, the senders EV have access to the "information by-path" FC through common apparatus LI or links. Finally, some informations originating from the register EN are translated by a translator TD before being sent onto the receiving apparatus.

The transmission of information through the "information by-path" takes place according to the "Time Division Multiplex System" principle, a time-position chosen inside a cycle, being assigned to each emitting unit-receiving unit pair. During each of these elementary time-positions, only a sample of information is transmitted as the transmission of a full information may necessitate several cycles.

The outgoing junctor JD, associated with the circuit CI, may also connect to the "information by-path" FC through a link circuit LI'. It may thus receive, from translator TD, a call-charging fee indication and then proceed with fee-charging the call.

The "information bypath circuit" FC comprises a first arrangement of wires $fi1b$ (FIG. 2) for the transmission of information from coupler CP onto markers MG, ML, and a second arrangement of wires $fi2b$ for the transmission of information in reverse direction. The translator TD is only inserted on the track of the first arrangement of wires, since it is not necessary to translate the items of information originating from the markers. The link $fi3$ is used by the translator to give to the register the instructions necessary for the further action to be given to the call, and to request from the register, if needs be, additional information.

*General operating process.*—Now will be described, by referring to FIGURE 3, the general operating process of the electronic translator, object of the present invention.

On the diagram of FIGURE 3, the de-coding matrices $dc1 \ldots dc6$, which enable to obtain, from a code "$m$ out of $n$," a decimal information, have been represented by a square having a grid inside it. The codes are received on the left side of the matrix (the horizontal lines of the grid) and decimal information are gathered from upon the lower side (the vertical lines of the grid).

The coding matrices $co2 \ldots co5$, which operate the reverse transformation, are shown in the same way as the decoding matrices, but differ from the latter by a small circle placed at the right higher part of the square. The decimal items of information are received on the lower part of the matrix (vertical lines of the grid) and the codes are gathered from upon the right side (horizontal lines of the grid). On the left side, it is possible to receive codes which are sent without any transformation on the right side.

The analysers AN, AN' receive a combination of several decimal digits and make appear a characteristic potential along a wire which depends upon the received combination. These are represented on the drawing by a long rectangle having inside it a reversed V.

The distributing frames RP1, RP2, RP'2, RP"2, RP4 are essentially made up of a grid of horizontal and vertical conductors. In order to establish a link, on request, it is merely necessary to insert a loose or movable plug at the cross-point of a horizontal conductor and a vertical conductor. This plug is represented by an X.

A vertical wire having an arrow, placed beneath a horizontal wire, corresponds to an "AND" gate. Thus, for instance an item of information arriving onto the left side of the distributing frame RP2, along wire fl1, cannot be transmitted onto the right unless there is found a given condition along wire fl2.

Finally, the amplifiers are represented, according to the usual method, by a square with a V inside it. The translator in FIGURE 3 is provided for analysing as a general rule a combination of four digits. To receive the first digit, only five wires A are available for use; the reception is effected in the form of signals along two wires out of the five. Thus, ten possible combinations are obtained which correspond respectively to the decimal digits 1, 2 . . . 0. The other three digits are received, according to the same process along wires B, C, D.

On wire Fa, it is possible to receive an item of information indicating that the received combination corresponds to a "national" dialling. The same item of information along wire Fb indicates that the received combination corresponds to a "regional" dialling.

Along wires E, the indication of the calling line category is received, always under the form of a code "two out of five."

Finally, the wires G are used for the reception of the "stage in process data" information, that is to say, characterizing the stage in which lies the routing of the call (first selection of the group, second selection of the group, external selection, call fee-charging). It is also possible to receive, along these wires, "modification data" information, in order to request, for instance, a diversion. The code used is always the same.

On output side, four groups of wires A', B', C', D' are available for use, and each one enables to gather a translated digit. Finally, wire YZ enables the translator to request from the register additional information in the case where this translator has not the necessary elements for achieving its function. This wire enables also the translator to send to the register a certain amount of information as to the further action necessary to give to the call. Thus, for instance, the translator may ask the register once or several times to send back to it the prefix (or office code) with request for translation, or the prefix without translation but by eliminating one or several digits. The translated digits are sent out in the form of codes "two out of five"; in case of information transmitted onto the register, a more complex code is used which increases the amount of possibilities. For instance, it is possible to transmit a code "two out of six," which affords fifteen combination.

In some cases, the digits received along wires A, B, C, D are retransmitted without any modification along the outgoing wires A', B', C', D', through the connection fl3.

The signals that correspond to the first digit, received along wires A, are amplified by the amplifier ap1, and then de-coded by means of matrix dc1. Thus, a given potential is made to appear along a wire fl4, chosen among 10, and characterizing the digit received. The signals corresponding to the other digits are amplified and decoded in the same way. The decimal items of information, gathered from upon wire fl4, and similar wires, are transmitted onto the analysers AN, AN', through the lower gate po4 which is normally conductive.

The two analysers AN and AN' are normally blocked. If the "national" information is received along wire Fa, the signal which corresponds to this information is amplified by tnt and transmitted, along wire fl20, onto the analyser AN, which then happens to be unblocked. If the "regional" information is received along wire Fb, the analyser AN' is unblocked in the same way. It will be assumed, in the following, that the "national" information is received.

The analyser then will make appear a given potential along an outgoing wire such as fl5 which characterizes the combination of the digits received. Such analysers are well known in the electromechanical switching art. An incoming wire is connected onto ten relay contacts, which respectively characterize the ten first digits possible. Each of those contacts is in turn connected onto ten other contacts which characterize respectively the ten second digits possible. Thus is obtained 10 × 10 = 100 outgoing points. By carrying on in the same way there is finally obtained a pyramid of contacts comprising one input and 10,000 outlets. In fact, this amount is only theoretical, because not all the combinations are used. In the electronic translator, object of the present invention, one proceeds in the same manner. The contacts of the pyramid which corresponds to the first digit are realized in the form of transistors either conductive or blocked; the contacts which correspond to the other digits are realized by means of a transistors which absorb or do not absorb the current supplied by the first transistors.

For every combination of digits received, it is possible to have a routing path or "route" correspond to it upon request. It is merely necessary to connect, by means of distributing frame RP1, the corresponding outgoing wire of the analyser onto one of the amplifiers rf, rg, which are, each one, associated with a given route. As a general rule, the amplifiers rf correspond to normal routes, the amplifiers rg correspond to special routes; finally, the amplifier rl corresponds to the request for one or two additional digits.

It will first be assumed that the combination received corresponds to a normal route. The outgoing wire of the analyser fl5 which corresponds to this combination is then linked to amplifier rf. First is checked whether it is possible to take that route, account being taken of the calling subscriber's category. In fact, the routes are distributed into several categories, and some of them may be forbidden to some definite categories of calling subscribers. The amplifier rf is connected, through the distributing frame RP2, to a wire fl6 which characterizes the category of the route under consideration. The signal received along outgoing wire fl5 of the analyser is amplified by rf and cr, then switched onto one of inputs fl7 of the comparator CPR. The latter comprises one input fl7 per route category. The indication of calling subscriber's category, received upon connection E in the form of a coded "two out of five," is decoded by the matrix dc5, and then transmitted onto one of the inputs fl8 of the comparator CPR. An input fl8 is provided per each calling subscriber category. In case there is no incompatibility between the route category and calling subscriber's category, the comparator generates a signal along wire fl9, in order to render conducting the gate po1, preparing thus the generating of the various translated digits. In the contrary case, it generates a signal along wire fl10 which un-blocks the gate po5, so as to put into service a special route amplifier rg and switch the call onto another path (operator's position, talking machine, etc.).

The comparator CPR may be realized by utilizing a matrix of resistors and diodes. By means of the route category indication, a given conductor is current-fed through a resistor; the current is transmitted from this conductor onto the corresponding outlet of the comparator, unless there be a short-circuit through a diode for certain calling subscribers' categories. It will first be assumed that the route considered, which corresponds to the amplifier rf, be authorized to the calling subscriber. Along wires G, a stage in process data information in code "two out of five" is received at the same time as the prefix (or office code), this information indicating that the first group selection operation should be started. This information is decoded by means of the matrix dc6, and then trannsmitted through amplifier bi and gate po1, onto wire fl2. Thus is made conducting the first gate po2, so as to enable the sending out of the first translated digit, necessary for the first group selection. To send out this digit, there are available ten wires *fl*11 connected respectively to the ten inputs of the coding matrix *co*3; the sending of the required digit is obtained by connecting wire *fl*11 corresponding to wire *fl*1 of the distributing frame RP2. Thus, for instance, if it is required to send out digit "2," the second wire *fl*11 connected onto wire *fl*1. The signal originating from amplifier *rf* is transmitted through: the first gate *po*2, wire *fl*1 and wire *fl*11, onto the required input of coding matrix *co*3. The latter transforms the information received along wire *fl*11 and delivers onto link C' the corresponding code "two out of five."

The second translated digit, necessary for the first group selection, is transmitted according to the same process through the coding matrix *co*4 and connection D'.

At the same time, through wires YZ, one or several items of information are transmitted to the register, in order to indicate to it the further action that is necessary to give to the call. This transmission takes always place according to same process. In the example considered here, the translator will be asking the register to send, at three different instances, the same information as sent before, that is: the prefix (or office code) dialled by the calling subscriber, the "national" indication and the calling subscriber's category. These items of information will, at the first time, be used for the second group selection; at the second time for the external selection and at the third time for fee-charging the call.

The function of the translator in the first group-selection operation is now terminated. When the reception of information along the incoming wires A, B, C, D, F*a*, E, G comes to an end, the translator is released and can be used for another call. Practically, the amount of time taken for the translation is of around ten microseconds; however, the time-position of the information by-path circuit assigned to an emitting apparatus-receiving apparatus pair of units is of about 120 microseconds, so as to account namely for the time this information will transit through the information by-path circuit; this latter amount of time is not negligible considering the long distance separating those two units. This point is more explicity described in the Patent No. 3,226,487 already mentioned at the beginning of the above specification.

When the register has to start the second group-selection operation, it sends onto the translator, along wires A, B, C, D, F*a*, E the same information as before. But on the other hand, it will send along wire G a "stage in process data" information indicating that the second group-selection is to be started. This information will be decoded by the matrix *dc*6 and transmitted, through the amplifier *bi* and the gate *po*1, onto wire *fl*12. Due to this fact the second gate *po*2 is unblocked, and, according to same process as for the first group-selection, two translated digits are sent out, one upon connection C' and the other upon connection D'.

The sending out of translated digits corresponding to the external selections is made according to the same process. There is just to be noted that wire *fl*13 and third gate *po*2 are made to intervene and three translated digits are sent out, one on connection B', the second one on connection C' and the third one on connection D'.

The sending out of the call-charging fee indication is accomplished still according to the same process, but in letting intervene the wire *fl*14 and the fourth gate *po*2. This indication includes only a single digit transmitted on connection D'. The following particularity will be noted, however. Normally, that is to say during the day, the higher and lower gates *po*3 are conducting for the first gate and non conducting for the second gate, under control of the switching mechanism CM; the ten wires *fl*15 are in service, the ten wires *fl*16 being not utilized. These wires *fl*15 are connected respectively to the corresponding inputs of the coding matrix *co*4; and in a more accurate way: the first wire is connected to the input No. 1; the second wire connected to the input No. 2 and so on. Consequently, if the coding matrix *co*4 receives, for instance, the call-charging fee indication "3" in decimal form, it retransmits the same indication "3" on connection D', in the form of a code "two out of five." In other words, it codes the call-charging fee indication, but does not modify it.

At night, a reduced call-charging fee is applied. For doing so the switching mechanism CM is acted upon by means of a manual switching apparatus represented symbolically on the drawing by the contact *tj–tn*; due to this fact, the respective positions of the two gates *po*3 are reversed, the wires *fl*16 being put into service, and the wires *fl*15 put out of circuit. Connecting the wires *fl*16 to the inlets of matrix *co*4 is effected in order to obtain application of a reduced call-charging fee. If it is admitted, for instance, that night fee is half of day fee, the *n*th wire *fl*16 will be connected to inlet of rank *n*/2.

In such a case, the call-charging fee indication delivered by the distributing frame RP2 is not merely coded, but its translation is effected so as to have same adapted for night service conditions. Measures however are foreseen, inside the switching mechanism CM, to prevent any change of position of gates *po*3 during the transmission of information between an emitting apparatus and a receiving apparatus.

In the receiving exchange, in order to orientate the local chain selectors, all, or a part of the digits which follow the prefix (or office code) must be sent out without translating them. The receiving exchange will indicate to the register of transmitting exchange, all the digits it needs. Assuming that they be four digits (thousand, hundred, ten, unit). The register seizes again the translator and sends these digits to it on connection A, B, C, D; but, at the same time, it sends on link G a "stage in process data" information indicating that merely a retransmission is to take place that is to say without any translation. This information is decoded by the matrix *dc*6 and amplified by *bp*. Due to this fact, the respective positions of the two gates *po*4 are reversed, the lower gate being non-conducting and the higher gate being conducting. The analysers AN, AN' can no longer receive any digits; yet on the other hand the first digit received is retransmitted without transformation along wire A through: amplifier *ap*1, gate *po*4, connection *fl*3 and wire A'. There is no decoding, and no coding; the digit, received in code "two out of five," is retransmitted such as. The other digits received on connections B, C, D, are retransmitted, according to the same process, on links B', C', D'. It will only be noted that the decoding matrices *co*2, *co*3, *co*4 are inserted on the retransmission track; but, since the incoming is effected from the left, these matrices do not accomplish any transformation and just limit themselves to retransmit the codes such as they have received them. On the diagram in FIGURE 3 these matrices have been left on the retransmission track so as to utilize a symbol sign in conformity with the symbol used in the drawings of FIGURES 4 to 7.

The entire translated information, including the call-charging fee indication, having been sent, the function of the translator in routing the call considered here, is terminated. In the example described in the present specification this translator was seized four times consecutively, yet the duration of its immobilization is very short, thus only one translator would be enough to handle the entire traffic of a large exchange.

Having so far disclosed the general case, there will now be described the various particular cases liable to take place during the routing of the call.

If there exists any incompatibility between the route category and the calling subscriber's category, the call is switched onto another path. Such is the case, for instance, of a subscriber with limited service who dials a restricted number and must be switched onto an operator's position or onto a speaking machine. For that purpose, the comparator CPR sends out a signal along wire fl10 and not along wire fl9. In such conditions the gate po1 remains non-conducting and there will be no possibility of obtaining any translated digit from the amplifier rf. On the other hand, the gate po5 is rendered conducting; therefore, through this gate and through the distributing frame RP4, feeding is made of the route amplifier rg which corresponds to the required path. From this amplifier rg, it is possible to obtain two translated digits for the first group-selection, two translated digits for the second group-selection, three translated digits for the external selections and a call charging fee indication. The process for sending these digits is the same as for the normal route.

In the case where it is an operator making a mistaken move by dialing a restricted number, there is no question of switching this operator onto another operator or onto a speaking machine, as she is supposed to know her work; the comparator just limits itself in sending onto the register, through: wire OC, coding matric co5 and wire YZ, an adequate information to ask the register to simply transmit to the operator the busy tone.

In some cases, it may be necessary to start a re-routing of the call. Thus, for instance, if all the circuits of the dialled group of lines are busy, the marker informs it to the register. The latter will consult once more the translators, but will be adding "modification data" information corresponding to a request for a re-routing or alternative routing. This information, received along wire G, is decoded by the matrix dc6 which delivers a signal, through wire fl17, onto comparator CPR. As previously mentioned, the latter unblocks gate po5, so as to put into service route amplifier rg which corresponds to the diverted or "auxiliary" path required. For one same normal path, several auxiliary paths can be provided; among the latter, the comparator makes a choice that takes into account the calling subscriber's category.

According to a well-known process the register would only ask for a "diversion," from the translator merely in respect of a call which has not been diverted yet. In the contrary case, it is the habit not to effect a second diversion, because the call might have the risk of not reaching its destination and will congest the circuits unnecessarily; the register will just limit itself in switching the caller onto an operator or onto a speaking machine.

Some routes are always authorized, no matter what the category of the calling subscriber may be; such is the case, for instance, of a route corresponding to a call for a local subscriber. It is then unnecessary to have the comparator CPR intervene.

When the translator does not receive enough digits for determining the translated items of information, the analyser AN causes the appearing along wire fl18 of a signal which is received upon the amplifier rl. Through distributing frame RP″2, coding matrix co5, and wire YZ, an adequate information is sent to the register requesting one or two additional digits. The register seizes subsequently the translator once more and gives it the requested information. In practice, the translator is seized after reception of the two first digits; and then one or two additional digits are sent to it if deemed necessary.

Some calls must be routed in different ways, at daytime or at nightime. Several distinct operators could for instance be foreseen for ensuring definite service during the day; at night, these operators are absent and the corresponding calls are switched onto a single transfer-desk position. To obtain this functioning, a switching unit is operated which is represented, symbolically, by the contacts sj–sn; the latter will in its turn act upon the switching mechanism CM, that causes the necessary circuit changes in the analyser AN′. Of course, means are provided, inside the mechanism CM, to prevent the switching from taking place when a transmitting apparatus and a receiving apparatus are put into connection through the information by-path circuit (faisceau connecteur).

In order to simplify the analysers, no translation is made of the non-existant prefixes (or office codes), which sometimes are very numerous. In the case of such a prefix being received, the analysers will not deliver any signal onto the amplifiers rf, rg, rl, and no translated digits are gathered at the output of the translator. A delaying device, placed inside the register, releases the various seized units only after a determined lapse of time.

*Detailed operating process.*—A detailed description will now be given, in conjunction with FIGURES 4 to 7 assembled as shown in FIGURE 8, of the main circuit in an embodiment of the translator.

In these diagrams, the same symbols as those of diagram in FIGURE 3, have been kept for representing the distributing frames and the movable or loose plugs.

The diodes placed at the cross points of the horizontal and vertical conductors of a matrix (matrix dc5 placed on the left of FIGURE 6, for instance) have been symbolically represented by a small oblique line with a full-stop at its end. The conducting direction of the diode is led towards that point.

When several units fill a similar function, only one unit will be represented, but, a figure in brackets will indicate the number of units. The same is done for the wires. Thus, for instance, there are 5 wires $n01 \ldots n05$ (FIGURE 4) and 5 amplifiers $1a \ldots 1e$.

In order to facilitate the reading of detailed diagrams in FIGURES 4 to 7, use has been made, whenever possible, of the same references as those on the diagram in FIGURE 3. In case of the contrary, the references in the detailed diagrams will be followed by an indication in brackets which enables to establish the correspondence with FIGURE 3. Thus, for instance, the five wires $n01 \ldots n05$ (left part of FIGURE 4) correspond to the connection A in the diagram of FIGURE 3.

In order to receive the first digit of the prefix (or office code), five wires are available for use, wires $n01 \ldots n05$ which are respectively connected to the amplifiers $1a \ldots 1e$. Normally, these wires are connected to earth, the transistor situated in each one of these amplifiers being blocked; the outgoing wires fl4 being therefore at a −12 v. potential because of the presence of non-conducting diodes di1 (clamping). The first digit is received in the form of a negative potential along two given wires chosen among the five wires $n01 \ldots n05$; the corresponding transistors will saturate, and outgoing wires fl4 will pass onto a potential neighbouring earth.

The second, third and fourth digit are received, respectively, along wires $n06 \ldots n10, n11 \ldots n15, n16 \ldots n20$, according to the same process.

It will first be assumed that the prefix be part of a national dialling; the item of information "national" is received in the form of a negative potential along wire n26, which results into the apparition of a potential neighbouring earth along wire fl20.

Now will be decoded the first digit received, that is to say, to make appear a characteristic potential along a wire, and one only, which depends upon this digit. For that purpose, a decoding matrix dc1 is available for use and is shown in a more explicit manner in FIGURE 9. This matrix comprises 5 horizontal conductors $a \ldots e$, and 10 vertical conductors $1, 2 \ldots 0$. Resistors, such as re1, re2, are placed in certain crosspoints. The code "two out of five" is received in the form of an earth on two of the conductors $a \ldots e$; the corresponding decimal indication is gathered in the form of an earth on one of the vertical conductors $1, 2 \ldots 0$. The following table shows the correspondence between the codes and the decimal items of information;

| Code: | Decimal indication |
|---|---|
| a+e | 1 |
| b+e | 2 |
| a+b | 3 |
| c+e | 4 |
| a+c | 5 |
| b+c | 6 |
| c+d | 7 |
| d+e | 8 |
| a+d | 9 |
| b+d | 0 |

This code is constituted in the following way: to each one of the elements a ... e is given a value or "weight," that is to say:

$$a=1 \qquad d=8$$
$$b=2 \qquad e=0$$
$$c=4$$

In order to find out the decimal indication which corresponds to a given code, it is just necessary to add up the corresponding weights and it is easy to check that the above table of correspondence coincides. The only exception to this rule concerns digit 7, which it will be impossible to obtain by means of two code elements; it was therefore decided, arbitrarily, to assign to it code c+d.

Normally, that is to say in the absence of information, the incoming wires a ... e are at a negative potential. The outgoing wires 1, 2 ... 0 happen to be also at a negative potential. When a code is received, in the form of an earth on two of the five horizontal conductors a ... e, the vertical conductor which corresponds to that code is found to be connected to earth. The other vertical conductors remaining connected to battery, because of respective positions of the resistors placed at the various cross points. Thus, for instance, if the first digit received is a 5 (code a+c), the earth applied to wires a, c is transmitted to the vertical conductor 5 through resistors re1, re2. On the other hand, a conductor other than 5, conductor 4 for instance, is placed at a negative potential through resistor re3.

An amplifier 1g (FIGURE 4) is associated to each of the outgoing wires of the decoding matrix dc1. Normally, that is to say in the absence of any reception of information, the incoming wire fl21 of this amplifier is at a negative potential and the transistor tr1 is saturated. The collector of this transistor is then at a potential neighbouring earth and the transistor tr2 is blocked. No current is transmitted along outgoing wire fl22. When a decimal information is received in the form of an earth applied to wire fl21, the transistor tr1 blocks itself; its collector passes onto potential —24 v. and the transistor tr2 saturates. Due to that fact, its emitter passes onto a potential neighbouring the potential of its collector, the outgoing wire fl22 being then at —12 v. potential. The amplifiers 1g fill up the same functions as the contacts of the first stage of a pyramid in currently used translators.

It was assumed, in the above specification, that the "national" item of information was received; thus, the outgoing wire fl20 of the amplifier tnt would be at a potential neighbouring earth. This potential is transmitted, through resistors such as re4, to all the vertical conductors of the decoding matrix dc1. Thus is not hindered the functioning of the amplifier 1g which corresponds to the first digit received. On the other hand, the wire n27 provided for the reception of the "regional" information remains connected to earth; the transistor placed in the amplifier to remains blocked, the outgoing wire fl'20 being at a —12 v. potential. This potential is transmitted, through resistors such as re5, to all the vertical conductors of the decoding matrix dc'1. By this means all the amplifiers 1h are blocked. That corresponds to the putting into service of the analyser AN of the national telephone numbers and to the putting-out-of service of the analyser AN' of the "regional" telephone numbers.

The second digit received is decoded by the matrix dc2 as was explained for the first digit, and, finally, results into the applying of an earth onto one of the ten outgoing wires fl23. The transistor 2N which corresponds to this wire is blocked. On the other hand, the other wires fl23 receiving no information, are at a negative potential and the corresponding transistor 2N is saturated.

Figure 12:
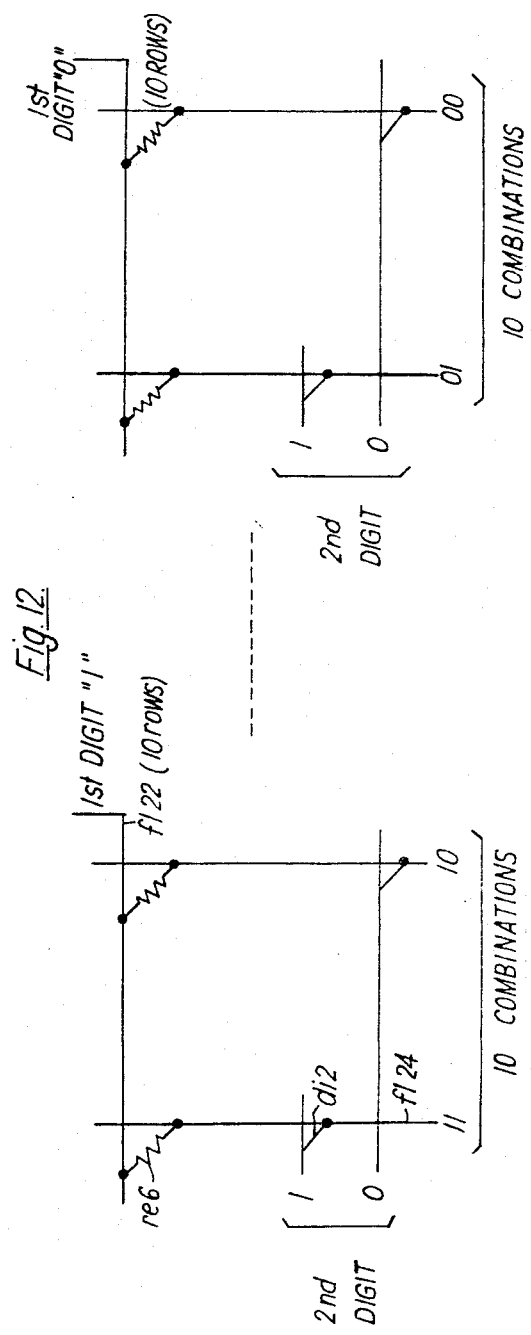
FIGURE 12 shows the analysing of the two-digits combinations.

Each one of the ten wires fl22 is linked, through resistors re6 and diodes di2, to the ten transistors 2N. Thus will be obtained one hundred wires fl24 which characterize each a combination of two digits. FIGURE 12 shows a schematic detail of the wiring; and it is seen that for each one of the hundred combinations, there must be provided a resistor re6 and a diode di2.

The operating of this arrangement is the following (FIGURE 4): if it is assumed, for instance, that the dialled prefix (or office code) is 55.36, the fifth wire fl22 is at a potential of —12 v. This potential is absorbed by all the transistors 2N, which are saturated except by the one which corresponds to the second digit received (5th transistor); indeed, this latter transistor is the only one to be blocked among the ten. Due to this fact, the outgoing wire fl24 which corresponds to the combination 55 happens to be alone at —12 v. potential. The transistors 2N fill up the same functions as the contacts placed at the second stage of a pyramid in translators of current use. It will only be noted that such a pyramid necessitates 10×10=100 contacts; in the analyser considered here, only ten absorbing transistors are used.

It will first be assumed that the combination of the first two digits received, would be enough to determine the route. The signal of —12 v. delivered by the analyser AN is then gathered from upon an outgoing wire such at fl5. The wires fl5 are connected, through the distributing frame RP1, either onto a transistor rf, or a transistor rg. There is one transistor rf or rg per route; the transistor rf corresponds to a normal route; the transistor rg corresponds to a special route or to a route which does not necessitate any analysing (call for local subscribers). Of course, it is possible by means of the distributing frame RP1, to assign a single and same route to several combinations of two digits, but it is necessary to provide decoupling devices, such as diodes, to avoid mixings between the wires fl5 corresponding to a same route. In the example described here, these diodes are integrated in the movable plugs of the distributing frames and have not therefore been shown, in an explicit manner, on the diagram.

Now will be undertaken the analysing of the route category in order to see whether there is any incompatibility between this category and the caller's category. Normally, the transistor rf is blocked by means of a +24 v. potential applied onto its base. When the analyser AN delivers 9—12 v. potential along outgoing wire fl5, the transistor rf saturates, its collector passing onto a potential of about —1 v. The emiter of rf is polarized to —0.8 v. for the following season: The diodes and the transistors that absorb the combinations other than the dialled ones, present a weak but not negligible impedance, so that there appears at the outgoing of the analyser a slightly negative voltage, of about 0.7 v., which would have as effect to unblock the transistor rf in an untimely manner in case its emitter had not been adequately polarized.

The collector of the transistor rf is connected through the distributing frame RP2, to a wire H; and the transistor cr, to one of the seven route category wires fl7. Normally, the transistor cr, of the type npn, is blocked by a —24 v. potential applied to its base. When the transistor rf saturates, the —1 v. potential delivered on its collector is transmitted to the base of the transistor tr, which saturates. Its collector passes onto a potential which neighbours the one of the emitter; that is to say, in the example given here, of —12 v. By choosing a route, one of the category wires *fl7* is therefore current fed.

Figure 6:
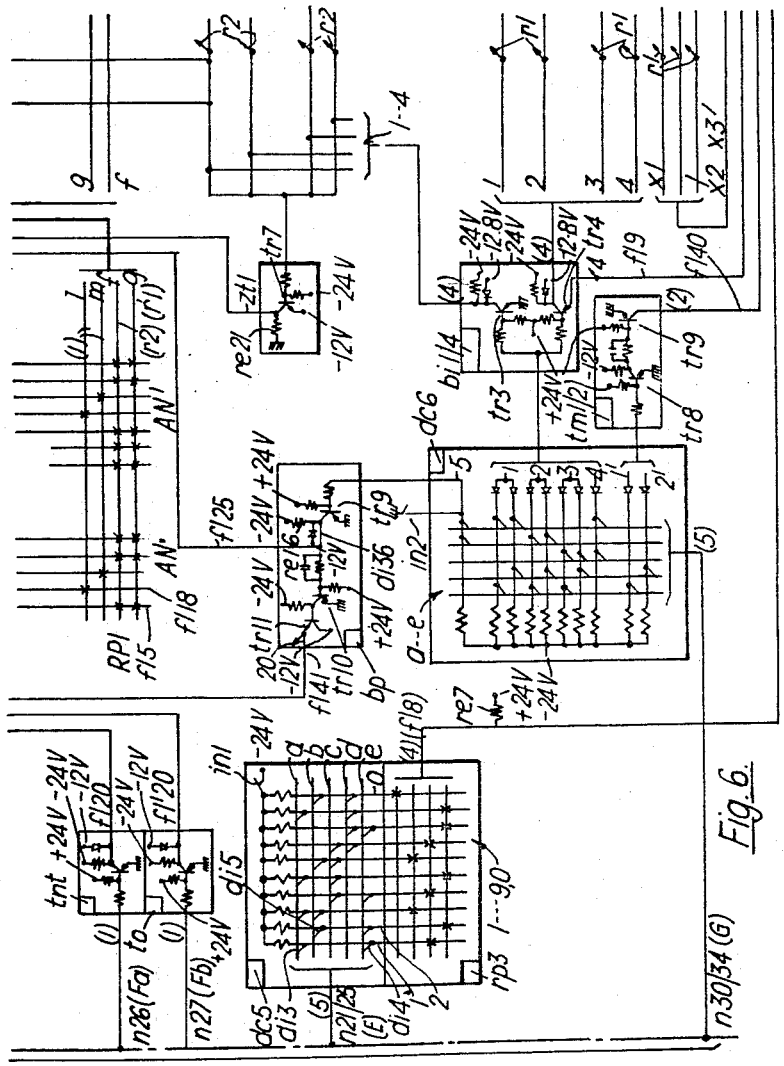

In order to receive the caller's category indication, there are five wires *n21* . . . *n25* (FIGURE 6 available for use. Normally, that is to say in the absence of information, these wires are connected to earth. An indication of category is received in the form of a —24 v. potential along two of the wires *n21* . . . *n25*. This indication is decoded by means of a matrix *dc5* comprising five horizontal conductors *a* . . . *e* and ten vertical conductors 1, 2 . . . 0. Diodes, such as *di3* and *di4*, are placed in certain cross-points. The decimal indication which corresponds to the code received, is delivered upon one of the ten vertical conductors. The table of the correspondings between the codes and the decimal items of information is the same as for the digits of the prefix (or office code).

In the absence of any information, the earth applied to the five wires *n21* . . . *n25* is transmitted, through the diodes, to the ten outgoing wires 1, 2 . . . 0.

When a code is received, in the form of a —24 v. potential along two of the five conductors *n21* . . . *n25*, the vertical conductor corresponding to this code is brought to a negative potential, the other vertical conductors remaining connected to earth, because of the respective positions of the diodes placed at the various cross-points. Thus, for instance, if the category indication received is a 1(code *a+e*), the —24 v. potential situated at the higher part of the matrix, is transmitted to the vertical conductor 1, without being short-circuited through diodes *di3, di4*. On the other hand a conductor other than 1, the conductor 2 for instance, is connected to earth, the —24 v. potential being short-circuited through diode *di5*.

By means of a distributing frame *rp3*, it is possible to connect each one of the outgoing conductors of the matrix *dc5* to one of the four wires *fl8*. Thus the number of categories to be analyzed is reduced to four, which in practice is quite enough. Decoupling diodes are integrated in the movable plugs of the distributing frame, as was mentionned for the analyzer.

At the same time as it receives the prefix the "national" indication, and the caller's category the translator will receive along wires *n30* . . . *n34* (FIGURE 6) an item of information which contains a double meaning; this information indicates at the same time the stage of the routing of the call (stage in process data) and an eventual request for a diversion (modification data). It is received, as the preceding ones, in code "two out of five," and is decoded by the matrix *dc6*, which operates according to the same principle as *dc5*.

The following table gives the correspondings between the received codes, their significations and the outgoing wires.

| Code | Stage in process data | Modification data |
|---|---|---|
| a+e | 1st group selection (wire 1) | Request for diversion (wire 1'). |
| b+e | do | Request for direct path (wire 2'). |
| a+d | 2nd group selection (wire 2) | Request for diversion (wire 1'). |
| b+d | do | Request for direct path (wire 2'). |
| a+c | External selections (wire 3) | Request for diversion (wire 1'). |
| b+c | do | Request for direct path (wire 2'). |
| c+e | Call fee-charging (wire 4) | |
| d+e | Retransmission without any translation (wire 5). | |

Each one of the items of information is delivered along the corresponding outgoing wire in the form of a negative potential, the absence of information being concretized by an earth.

The wire 1', 2' are respectively linked to the units *tm1*, *tm2*. The modification data information along wire 1' (request for diversion) saturates the transistor *tr8* normally blocked; the collector of this transistor passes onto a potential neighbouring earth, and this blocks the transistor *tr9* normally saturated. The wire *fl40*, connected to the collector of this transistor, remains isolated. In the absence of any information along wire 1', the opposite takes place; the transistor *tr8* is blocked; the transistor *tr9* is saturated, and the wire *fl40* is at a potential neighbouring the earth potential. It would be possible to make a similar reasoning concerning: wire 2', equipment *tm2* and second wire *fl40*. This discussion can be summed up in the following table:

| No., wire *fl40* | State | "Modification data" |
|---|---|---|
| 1 | Isolated | Request for diversion. |
| 2 | Earth | |
| 2 | Isolated | Request for direct path. |
| 1 | Earth | |

Figure 7:
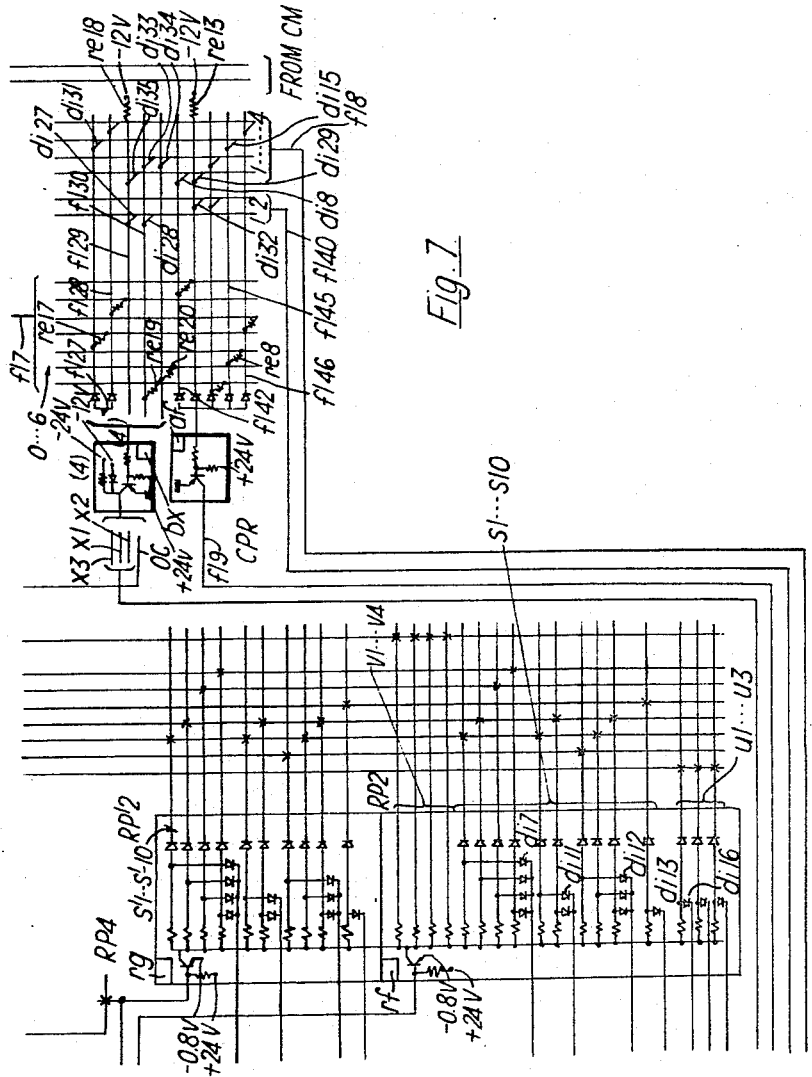

The two wires *fl40* are connected, on the other hand, to the comparator CPR (FIGURE 7).

The comparator CPR, provided to effect the comparing between the route category and the caller's category, is essentially made up of a matrix of resistors and diodes. It has seven route-category wires *fl7*, four caller's category wires *fl8*, two wires *fl40* for the request of direct or diversion path, five outgoing wires *fl42* . . . *fl46* for the normal routes, and, four outgoing wires *fl27* . . . *fl30* for the auxiliary of secondary paths or the switching onto busy condition. The assignments for these various wires are given by the following tables:

Wire *fl7* No:   Route category

0 _____ Authorized to operator.
   1 _____ Forbidden to operator.
   2 _____ Authorized to restricted subscriber No. 1.
   3 _____ Forbidden to restricted subscriber No. 1.
   4 _____ Authorized to restricted subscriber No. 2.
   5 _____ Forbidden to restricted subscriber No. 2.
   6 _____ Route without diversion.

Wire *fl8* No.:   Caller's category

1 _____ Normal subscriber.
   2 _____ Operator.
   3 _____ Restricted subscriber No. 1.
   4 _____ Restricted subscriber No. 2.

Outgoing wire:   Route

*fl42* . . . *fl46* __ Direct route.
   *fl28* _____ Auxiliary (or secondary) path (for subscriber).
   *fl29* _____ Auxiliary (or secondary) path (for operator).
   *fl27* _____ Switching onto operator.
   *fl30* _____ Switching onto busy condition.

Some simple examples will enable to well understand the operating of the comparator.

It will be assumed first that the caller by a restricted service subscriber No. 1, and that the dialled route be allowed to him. A —12 v. signal is delivered by the transistor *cr* along route cataegory wire *f17* No. 2. As the caller's category wire *fl8* No. 3 is at —24 v., the diode *di15* is rendered non-conducting; the signal —12 v. is transmitted through: resistor *re8*, wire *fl45* and a decoupling diode, onto transistor *af*, and that enables the seizure of the normal route.

If the dialled route is forbidden to the restricted subscriber No. 1, the —12 v. signal arrives along route category wire No. 3. The diode *di31* being conducting by the —24 v. applied to caller's category wire No. 3, this signal is transmitted, through resistor *re17*, onto wire *fl27*, and this switches the call onto an operator or onto a speaking machine.

In case it is a subscriber from another category who dials the same route, no signal can be gathered from upon outgoing wire *fl45*; in fact, the diode *di15* is conductive, the —12 v. signal being then derived through the following circuit: diode *di15*, caller's category wire No. 3, resistor *re7*, +24 v. In order to allow, eventually, the access of that route to a caller from another category, it is necessary to foresee the current feeding, in −12 v., along another route category wire; generally speaking, it is possible to assign to every route up to four category-wires, a same route can be accessible to all calling-subscriber-categories. This being the purpose for the presence of the four wires V1 . . . V4 connected to the collector of the route transistor rf.

In the case of a normal subscriber, the route category is not taken into consideration since no restriction exists for such a subscriber. The −12 v. signal is transmitted through the resistor re13, if there is a request for a direct path (diodes di29 and di32 non-conducting). On the other hand, in case there is a request for diversion, the −12 v. signal is transmitted along wire fl28 through the resistor re18 (diodes di35 and di27 non-conducting). The output along wire fl28 corresponds to the seizure of an auxiliary (or secondary) path. If the dialled route does not possess an auxiliary (or secondary) path, the −12 v. signal is transmitted, form route category wire No. 6 onto wire fl42 and transistor af; the normal route is taken; the signal along outgoing wire fl28 remains without any effect since the diverted path does not exist.

When an operator asks for a diversion, the −12 v. signal given by route category wire No. 0, is transmitted through resistor re19, onto wire fl29 (diodes di33 and di28 non-conducting); thus an auxiliary (or secondary) line is taken, which for a same normal route can be different from the one used by a subscriber.

Finally, when an operator dials a forbidden telephone number, the −12 v. signal is transmitted through the resistor re20, onto wire fl30 (diode di34 non-conducting), and that corresponds to the switching of operator onto "busy condition."

Of course, the mounting of comparator CPR was only given as example; it is quite evident that it can be modified to meet other requirements.

It will be assumed first that the dialled route be allowed, account taken of calling subscriber's category. Normally, the transistor af is blocked by the +24 v. applied to its base. When the +12 v. signal is received along one of the wires fl42 . . . fl46, this transistor saturates, its collector passes unto a potential neighbouring the earth potential. This earth is transmitted, through the wire fl9, to the emitters of transistors tr4, in order to enable the passage of the "stage in process data" information.

The outgoing conductors 1 . . . 4 of the decoding matrix dc6 are respectively linked to the units bi1 . . . bi4 comprising each one two transistors tr3, tr4. Normally, that is to say in the absence of any "stage in process data" information, every transistor tr4 is blocked by means of the +24 v. potential applied to its base; its collector is, therefore, placed at a −12.8 v. potential applied through a blocking diode. The potential neighbouring earth, delivered by the collector of the route transistor rf, is therefore absorbed through diodes di7, di11, di12, di13; it cannot therefore be transmitted to the wires S1 . . . S10. When the "stage in process data" information which corresponds to the first group selection is received, the outgoing conductor 1 of the matrix dc6 is put at a negative potential, and that saturates the transistors tr4 of the unit bi1. Its collector passes onto a potential neighbouring the earth potential. Due to that fact, the signal delivered by the collector of the route transistor rf can be transmitted along wires S1 . . . S4 without being short-circuited through the diodes di7 and the wire 1. The diodes di7 correspond to the first of the gates po2 of the block diagram in FIGURE 3.

By means of the distributing frame RP2, it is possible to link, upon request, the wire S1 to one of the ten wires C1; thus is obtained, for the first digit of the first group selection, a decimal information chosen among 10.

In order to transform this information into code "two out of five," a coding matrix co3 is available for use and is shown in a more explicit way in FIGURE 10.

Figure 5:
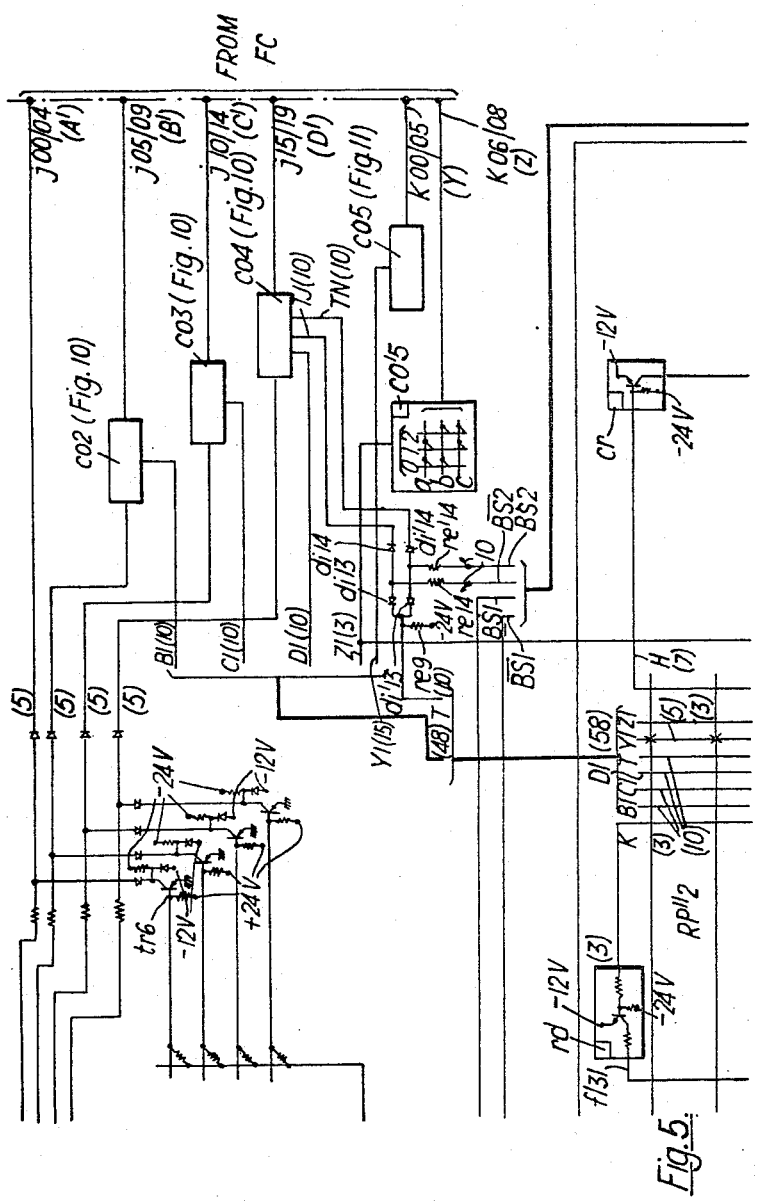

This matrix comprises ten vertical conductors 1, 2 . . . 0 and 5 horizontal conductors a . . . e, as well as a certain number of diodes such as di9 and di10. As is indicated by the arrows, the decimal items of information are received on the lower part of matrix, and the corresponding codes are gathered upon the right side. Normally, that is in the absence of any information, the conductors 1, 2 . . . 0 are at a negative (or isolated); the outgoing conductors a . . . e also are at this potential (or isolated). A decimal item of information is received in the form of a potential neighbouring the earth potential, delivered by the route transistor rf; this earth is transmitted to two of the five outgoing conductors a . . . e. The table of correspondings between the decimal items of information and the codes is the same as the one given at the beginning of the present specification. Thus, for instance, if the decimal digit 5 is received, the two diodes di9, di10 are made to intervene, and there is finally gathered the code a+e. For the first group selection, this code is sent along the outgoing wires of the translator j10 . . . j14 (FIGURE 5).

The second translated digit used for the first group-selection will be transmitted according to the same process, but by making intervene; the wire S2, a wire D1, the coding matrix co4 and the outgoing wires j15 . . . j19.

As was already explained in the description of the block diagram, the translator communicates to the register, during the first group selection, a given information to indicate to it the further action that is to be given to the call. In the example described here, the register must send once more, at three different instances, the same information, namely the prefix (or office code), the "national" indication, and the caller's category; the translator having to make use of this information first time for the second group-selection, second time for the external selections and third time for the call fee-charging. In order to establish the corresponding translated information, wire S3 is connected, through the distributing frame RP2, to one of the fifteen wires Y1, and wire S4 connected to one of the three wires Z1; thus will be obtained two translated digits giving 15×3=45 combinations. The first one of these two digits is transformed, by means of the matrix co5, into a code "two out of six" and transmitted onto outgoing wires k00 . . . k05. The matrix co5 is shown in a more explicite way in FIGURE 11; its operating process is identical to the one of the matrix in FIGURE 10. The second translated digit is transformed, by means of matrix co'5, into a code "two out of three" and transmitted along outgoing wires k06 . . . k08.

The part played by the translator in the first group-selection is now terminated. When the reception of information along the various incoming wires n01 . . . n34 comes to an end, the various transistors used restore to their initial position; the translator is released and can be used for another call. The period of time for the transit of the information through the translator is very short, since it only makes intervene merely a few transistors.

When the second group-selection is to be undertaken, the translator receives the same information as for the first group-selection, but the "stage-in-process data" item of information received along wire n30 . . . n34, indicates to it that it must send the translated digits which correspond to the second group-selection.

The outgoing wire 2 of the decoding matrix dc6 is put to a negative potential, and that saturates the transistor tr4 of the equipment bi2. A potential neighbouring the earth is delivered by the collector of this transistor and transmitted through wire 2 onto the diodes di11 which correspond to the second gate po2 in the block diagram. Thus, the potential neighbouring the earth and delivered by the collector of the transistor rf is transmitted to the two wires S5, S6 without being absorbed through the diodes di11; therefore two translated digits are emitted according to the same process as for the first group-selection.

The translated digits corresponding to the external selections are emitted according to the same process, by making intervene the diodes *di*12. Three digits are sent instead of two, the first one along wires *j*05 . . . *j*09, the second one along wires *j*10 . . . *j*14 and the third one along wires *j*15 . . . *j*19.

The call-charging fee indication is emitted in the same way, by making intervene the diode *di*13. However, the mechanism is a little different according as to whether it is the day-time call-charging fee, or the night call-charging fee, that is to be applied. During day time, the wire $\overline{BS2}$ (FIGURE 5) is connected to earth by the switching mechanism CM (not shown).

The wire BS2 is at −12 v. The wire $\overline{BS2}$ is linked, through resistors *re*14 and diodes *di*14, to the ten inputs TJ of the coding matrix *co*4. On the other hand, the wire S10 originating from the route transistor *rf* is linked, through the distributing frame RP2, onto one of the ten wires T assigned to the call-fee-charging indications; and, the ten wires T on their side, are connected, through diodes *di*13, *di*14, onto the corresponding inputs TJ of the coding matrix *co*4. The earth that is applied to wire $\overline{BS2}$ is absorbed through diode *di*13 and resistor *re*9, except in the case of the wire T connected to route transistor, since the said wire is at a potential neighbouring earth. In such condition, an earth is applied to the input of the coding matrix *co*4 corresponding to the required call-charging fee, the matrix will be delivering then the code "two out of five" along wire *j*15 . . . *j*19.

At night, the potentials of the two wires $\overline{BS2}$ and BS2 are reversed, BS2 being connected to earth and $\overline{BS2}$ is at −12 v. The wire BS2 is multipled, through resistors *re′*14 and diodes *di′*14, upon all the inputs of coding matrix *co*4, but the wires T are connected to the inputs of this matrix, so as to obtain the charging of a reduced call charging fee, as was already mentioned in the description of the block diagram. The diodes *di*13, *di*14, *di′*13, *di′*14 correspond to the gates *po*3 of that diagram.

In order to orientate the selection stages of the chain in the receiving exchange, use is generally made of a part or of the whole of the telephone number dialled by the caller, but without any translation. The register of the exchange considered here receives the necessary instructions from the register of the receiving exchange; it sends the digits to the translator and asks the latter to retransmit them without any modification. Since only four groups of wires are available for receiving these digits (*n*01 . . . *n*05, *n*06 . . . *n*10, *n*11 . . . *n*15, *n*16 . . . *n*20), it is only possible to process merely four digits at a given instance. This quantity of four is often quite enough; in the contrary case, the translator will be requisitioned twice. According to a variant, the outgoing register is able to receive the instructions from the translator itself, by making use of wires *k*00 . . . *k*05, . . . *k*06 . . . *k*08.

The reception of the digits to be sent back without any translation is accomplished as for the prefix (or office code), but at the same time is received, along wires *n*30 . . . *n*34, a "stage in process data" item of information which results into the applying of a negative potential onto outgoing conductor 5 of the decoding matrix *dc*6. Normally, that is to say in the absence of any reception of information, the transistor *tr*9 of the unit *bp* is blocked by the earth applied to wire 5; its collector is therefore at the −12 v. potential. This collector is linked, through wire *fl*25, to the base of the transistor of equipment 10. This transistor, of the type npn, is normally made non-conducting by means of a −24 v. potential applied to its base; consequently, wire *fl*26 is isolated. The transistors such as *tr*6 are blocked by means of a +24 v. potential applied to their bases, their collectors being therefore at a −12 v. potential.

Thus, the earth impulses, originating from the input amplifiers 1*a* . . . 1*e*, 2*a* . . . 2*e*, 3*a* . . . 3*e*, 4*a* . . . 4*e*, are absorbed and cannot be transmitted onto the corresponding outgoing wires *j*00 . . . *j*04, *j*05 . . . *j*09, *j*10 . . . *j*14, *j*15 . . . *j*19.

When the "stage in process data" information is received indicating that there is not to be any translation, the outgoing conductor 5 of the decoding matrix *dc*6 is put onto a negative potential, as has been already mentioned, and this saturates the transistor *tr*9. The latter's collector passes then onto a potential neighbouring the earth potential; this potential is transmitted, through wire *fl*25, to the base of the transistor of equipment 10, which saturates: due to that, the collector of this transistor passes onto a potential neighboring −12 v.; this potential is transmitted, through wire *fl*26, to the bases of the transistors *tr*6, and these latter will saturate. Their collectors pass onto a potential neighbouring the earth potential, so that the earth impulses originating from the input amplifiers can no longer be absorbed. Thus, the four digits, received in the form of codes "two out of five" along incoming wires *n*01 . . . *n*05, *n*06 . . . *n*10, *n*11 . . . *n*15, *n*16 . . . *n*20, are retransmitted without any modification, along the corresponding outgoing wire *j*00 . . . *j*04, *j*05 . . . *j*05, *j*10 . . . *j*14, *j*15 . . . *j*19; there is no translation, no coding and no decoding. without any doubt, the matrices *co*2, *co*3, *co*4 are inserted upon the retransmission path; but, when FIGURE 10 is examined, it is seen that incoming wires *a* . . . *e* situated on the left are metallically linked to the outgoing wires *a* . . . *e* situated on the right, so that the matrix does not act any part of function in the case considered here.

Of course, in order to obtain this functioning, it is necessary to provide a transistor *tr*6 for each retransmission wire, that is to say 20 transistors. Since neither the "national" indication, nor the "regional" indication are received, the two analysers are blocked and no translation is operated.

However, the amplifiers which correspond to the "national" and "regional" information may be out of order; it has therefore not seemed superfluous to take an additional precautions and block the two analysers. When a "stage in process data" information is received requesting the retransmission of the digits without any translation, the transistor *tr*9 is saturated, as was already mentioned; its collector is therefore at a potential neighbouring earth, and the transistor *tr*10 normally saturated by a −12 v. applied through the diode *di*36, is made non-conducting. Its collector passes therefore onto −24 v. potential and the transistor *tr*11, normally blocked, saturates; its emitter passes onto a potential neighbouring the potential of its collector, that is to say −12 v. This potential is transmitted, through wire *fl*41 and the resistors *re*12, *re′*12, onto the higher inputs of the decoding matrices *dc*1, *dc′*1, and this has, as an effect, the blocking of the analysers, if these are not already blocked.

The function of the analyzer concerning the call under consideration is terminated and now will be taken up the various particular cases liable to take place during the functioning.

If the combination of the two first digits received is not sufficient to determine the routing of the call and if a third digit is essential, the translator requests this digit from the register, and then liberates. The outgoing wires *fl*18 of the analyzer (FIGURE 6) which correspond to such combinations are all linked, through the distributing frame RP1, onto wire *l* and from there onto the route transistor *rl*. By accomplishing an adequate link between the outlet of this transistor and one of the 10 wires Y1, through distributing frame RP″2, an item of information corresponding to the request of a third digit is transmitted to the register. When this digit is received, two of the five wires *n*11 . . . *n*15 are brought to a negative potential; the transistor of the unit 3*l* saturates, the signal previously emitted along outgoing wire *fl*18 of the analyzer is being absorbed through the diode *di*30. The translator having obtained satisfaction, asks nothing more from the register.

If the combination of the first two digits received indicates that two other digits are required to determine the routing, the translator requests these two digits from the register. The operating process is the same as in the preceding case, but wire *m* and route transistor *rm* are made to intervene. This number having been received, the signal delivered by the analyzer is absorbed by the transistor of the unit 4*m*.

In order to analyze a combination of three digits, every wire *fl*22, originating from an amplifier 1*g*, is connected to the ten absorbers 2N through resistors *re'*6 and diodes *di*17. The absorbers 3N are constituted like the absorbers 2N and operate in the same manner. Thus, 1,000 wires *fl*32 are obtained, characterizing each one a combination of the first three digits. Of course, this amount is only theoretical, since the three-digit-combinations are not all utilized. For each of these combinations, a resistor *re'*6, diode *di'*2, and a diode *di*17, are provided. When the first digit is received, a −12 v. signal is made to appear along the corresponding wire *fl*22. This signal is absorbed, through the diodes *di'*2, by all the units 2N, with the exception of the one which corresponds to the second digit received; likewise it is absorbed, through the diodes *di*17, by all the units 3N, with the exception of the one corresponding to the third digit received. Finally, the signal only appears along wire *fl*32 characterizing the three-digit-combination. Each of the wires *fl*32 is connected, through the distributing frame RP1 either onto a route transistor *rf*, or onto a route transistor *rg*. FIGURE 13 shows a wiring detail of the analysis of the three-digit-combinations.

The analysis of a combination of four digits is effected according to a similar process, by letting intervene absorbers 4N. The signal is gathered upon a wire such as *fl'*32.

In case there is re-routing of the call on an auxiliary or secondary path, or a switching of the call onto an operator or busy condition, a −12 v. signal is delivered along one of the outgoing wires of the comparator *fl*27 . . . *fl*30 as was already metioned. These wires are connected respectively to the wires *x*3, *x*1, *x*2, OC, through the transistors *bx*. Normally, each one of these transistors is blocked by means of a +24 v. potential applied to its base. When the −12 v. signal is received along one of the wires *fl*27 . . . *fl*30, the corresponding transistor saturates, its collector passing onto a potential neighbouring the earth potential. This earth is transmitted along one of the wires *x*1, *x*2, *x*3 or along the wire OC.

In the first case, the signal delivered by the route transistor *rf* is transmitted along one of the wires U1, U2, U3, without there being a short-circuit through the corresponding diode *di*16. By means of the distributing frame RP2, these wires are respectively connected to the three wires K, and from there onto the three transistors *rd*. Normally, each of these transistors is blocked by means of a −24 v. potential applied to its base. When the route transistor *rf* delivers a signal along wire K, the transistor *rd*, saturates; the potential of wire *fl*31 connected to its collector will be passing onto −12 v. This wire is, itself, connected through distributing frame RP4, onto a route transistor *rg* which corresponds to the required re-routing path. This transistor is normally blocked, but it saturates immediately the signal is received along wire *fl*31. From this route transistor, the various translated digits are sent out, as was explained for the route transistor *rf*.

In the case where the caller must be connected to the busy condition tone, the wire OC is connected to earth. The latter being connected to one of the inputs of the coding matrix *co'*5, an adequate information is transmitted to the register through wires *k*06 . . . *k*08, in order to request it to do the necessary.

The route transistors *rg* are also linked, through wires *g*, onto the outlets of the analysers, it is thus possible to reach directly the corresponding route by means of an adequate prefix.

These route transistors are not linked to the wires H and therefore do not have access to the comparator. Consequently, no close approach or comparison is made between the route category and caller's category. Since the emitter of the transistors *tr*3 (FIGURE 6) is being connected permanently to the earth, the route is always authorized. In the case of calls for local subscribers, which are accessible to all the callers, it is possible to use a route transistor *rg* instead of a transistor *rf*.

Figure 4:
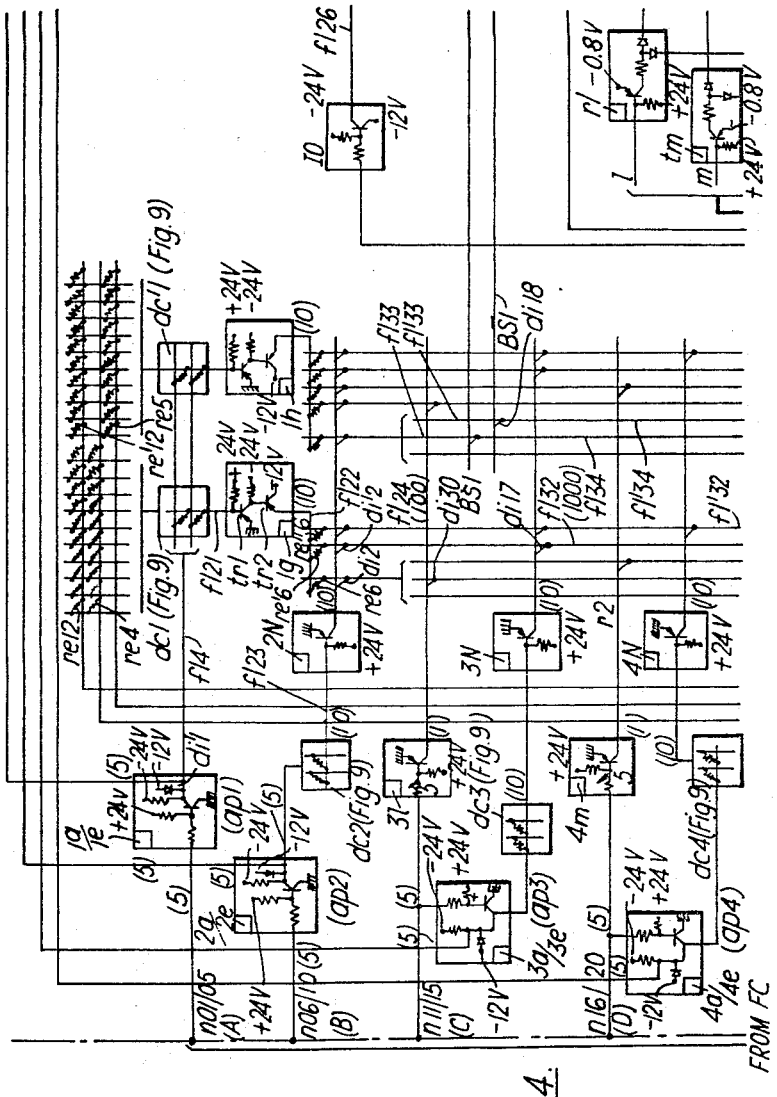
FIGURES 4 to 7, show a detailed scheme of the translator in FIGURE 3.

As was already mentioned in the description of the block diagram, some prefixes give place to different routings at daytime and nighttime. During the day, the wire $\overline{BS1}$ is at a negative potential and the wire $\overline{\overline{BS1}}$ is connected to earth, these polarities are applied by the switching mechanism CM (not shown on figure). When the translator receives such a prefix, a signal is made to appear simultaneously along wires *fl*33 and *fl'*33 of the analyser AN' (FIGURE 4). The signal received along wire *fl'*33 is short-circuited through the diode *di*18, because of the presence of the earth applied to wire $\overline{\overline{BS1}}$; finally, the signal is only transmitted along the outgoing wire *fl*34. At night, the contrary takes place; the wire $\overline{\overline{BS1}}$ is at a negative potential and the wire $\overline{BS1}$ is connected to earth; the signal is transmitted only along wire *fl'*34.

In the absence of any "stage in process data" information concerning a translation, the transistors *tr*3 of units *bi*1 . . . *bi*4 (FIGURE 6 are blocked, as was already mentioned; the wires 1 . . . 4 originating from these units are at a −12.8 v. potential. Consequently, the transistor *tr*7 is also blocked, the wire *zt*1 being connected to the earth through resistor *re*21. When a "stage in process data" information is received relating to a translation, it is the contrary that takes place; the transistors *tr*3 and *tr*7 are saturated and the wire *zt*1 passes onto a potential neighbouring −12 v. The wire *zt*1 ends onto the night-day switching mechanism CM (not shown on figure).

The latter is thus notified that transmission of translated information has taken place during the scanning cycle considered here; it concludes that an emitting unit is in communication with a receiving unit, and will postpone for later on the night-day switching.

To put the translator out of service, the two contacts *in*1, *in*2 (FIGURE 6) are operated. Contact *in*1 being open, the −24 v. current-feeding is cancelled from upon decoding matrix *dc*5; thus is blocked the passage of the category-indications, as well as, subsequently, the operating of the comparator CPR. No translated number can any longer be sent. In *in*2, the passage is blocked of the "stage in process data" information coresponding to the retransmission of numbers without translation; this retransmission is therefore rendered impossible.

The translator, object of the present invention, can afford other possibilities. The corresponding circuits have not been shown, in order not to complicate the diagrams, but they can easily be realized by the man skilled in this technique. Thus, for instance, there can be provided a code "two out of six" to receive the first digit; fifteen combinations will be obtained, that is, ten numerical combinations which correspond respectively to the decimal numbers 1, 2 . . . 0, and 5 combinations so-called extra-numerical. By utilizing two extra-numerical combinations and by combining them with a second number, there will be obtained 2×10=20 additional combinations. Such combinations are not accessible to the subscribers, but can be utilized for different purposes, either by the operators, or by the automatic units of the exchange.

It would also be possible, according to a known process, to request a group selection by means of a translated digit followed by a non-translated digit; thus will be realized an economy in route transistors since only one transistor will be use for ten different groups of lines.

It is to be understood, of course, that the foregoing description has just been given as a way of non-limitative example, and numerous other embodiments can be achieved without limitation to the scope of the present invention. The amount of information received or sent out could be increased; other codes could be used; the amplifiers, the gates, the coding and decoding matrices, could be realized in a different way. The various numerical data, in particular, was only mentioned by way of example to facilitate the explaining of the general operating process, and are liable to vary with each installation.

*Summary*

Improvements to telephone systems, relating namely to a translator constituted by the combination of the following elements: (a) input decoders to receive, in code form, the various digits of the prefix (or office code) and to deliver in clear the corresponding indications, (b) an analyser, to combine these indications and to determine a route which corresponds to the combination, (c) an amplifier for every route, situated at the output of the analyser and delivering in succession, under control of "stage in process data" information, the various translated digits in clear, (d) output decoders, to put into code the digits originating from the route amplifier, and to transmit them to the units utilizing them; each one of these elements being realized by means of electronic components, so as to enable a very rapid translation.

What is claimed is:

1. An electronic translator for use in a telephone system for translating directory number data into locational data comprising input decoding means for converting coded signals indicative of a desired line directory number into corresponding decimal signals, analyzing means for translating said line directory number decimal signals into locational decimal signals indicative of the location of the desired line, comparator means for selectively blocking and passing said locational decimal signals, and output coding means for coding said passed locational decimal signals into coded locational signals.

2. An electronic translator as set forth in claim 1 wherein each of said output coding means corresponds to respective route directions, and wherein adjusting means is provided for selectively directing said locational decimal signals to desired ones of said output decoders.

3. An electronic translator as set forth in claim 1 wherein a normally blocked by-path circuit is provided between the output of said input decoding means and the input of said output coding means, and wherein gating means selectively unblocks said by-path circuit to transfer the said decimal line directory number signals thereover independently of said analyzing means.

4. An electronic translator as set forth in claim 1 wherein fee-charging coding means is provided for generating fee-charging signals corresponding to the locational decimal signals from said analyzer means, and selectively operable means for modifying said fee-charging signals according to the time of day of the establishment of a call.

5. An electronic translator as set forth in claim 1 wherein a plurality of paths for routing said locational decimal signals extend between said analyzing means and said output coding means, and wherein gating means is controlled by digit sequencing signals to control the passing and blocking of said locational decimal signals over said paths.

6. An electronic translator as set forth in claim 5 wherein means is provided for signalling control equipment associated with said electronic translator to supply additional coded directory number data responsive to said locational decimal digits from said analyzing means being insufficient to complete a routing.

7. An electronic translator as set forth in claim 5 wherein said directory number data is accompanied by subscriber category data, and wherein input decoding means is provided for converting said category data into decimal category data for transmission to said comparator means.

8. An electronic translator as set forth in claim 7 wherein said gating means is controlled by said comparator means to direct the said locational decimal signals to intercept equipment responsive to said subscriber category data signals indicating the calling of unauthorized directory number data.

No references cited.

KATHLEEN H. CLAFFY, *Primary Examiner.*

W. C. COOPER, *Assistant Examiner.*